United States Patent [19]

Grabowy

[11] Patent Number: 4,588,862

[45] Date of Patent: May 13, 1986

[54] VISUAL DISPLAY NETWORK INTERFACE

[76] Inventor: James G. Grabowy, 813 Beau Dr., Des Plaines, Ill. 60016

[21] Appl. No.: 571,073

[22] Filed: Jan. 16, 1984

[51] Int. Cl.[4] .................... H04M 1/24

[52] U.S. Cl. .................... 179/81 C; 179/175.3 F; 179/179

[58] Field of Search .......... 179/81 C, 84 L, 175.3 F, 179/175.3 R, 99 LS, 179, 81 R

[56] References Cited

U.S. PATENT DOCUMENTS

| | | | |
|---|---|---|---|
| 4,197,435 | 4/1980 | Jackson et al. | 179/175.3 R |
| 4,369,341 | 1/1983 | Ahuja | 179/175.2 R |
| 4,388,501 | 6/1983 | Ahuja | 179/175.3 R |
| 4,413,163 | 11/1983 | Basini | 179/175.3 R |

OTHER PUBLICATIONS

"Project of the Month–Tri-State LED Demonstrator", Popular Electronics, Mims, 1979, p. 102.

*Primary Examiner*—James L. Dwyer
*Attorney, Agent, or Firm*—Woodard, Weikart, Emhardt & Naughton

[57] ABSTRACT

A visual display network interface for placement between the incoming telephone network access line to a structure and user telephone equipment within the structure for indicating the operational status of the network access line and the user equipment includes a modular housing disposed between the network access line and the user telephone equipment wherein the housing includes an electrical circuit providing a pair of light-emitting diode indicators which are operable in either an illuminated or an unilluminated mode depending upon the status of the network access line and the telephone equipment within the premises. The circuit arrangement is designed to indicate whether or not continuity of the network access line exists as well as where a fault may be located if the user telephone equipment fails to operate properly. The user is able to determine which or both of the light-emitting diodes are illuminated and from that determination the user is able to indicate what portion of the overall system, if any, is malfunctioning. For example, if one of the two sides of the incoming network access line has lost continuity, a first one of the light-emitting diodes will not illuminate. Consequently, an unilluminated condition on this particular light-emitting diode will immediately signify to the user of the equipment that there is a loss of continuity in that network access line. Similarly, an unilluminated condition on the other light-emitting diode will indicate a fault with the user telephone equipment.

6 Claims, 5 Drawing Figures

31
21
(-50 VDC)
23
24
25
27
29
26
30
("0"VDC)
20
22

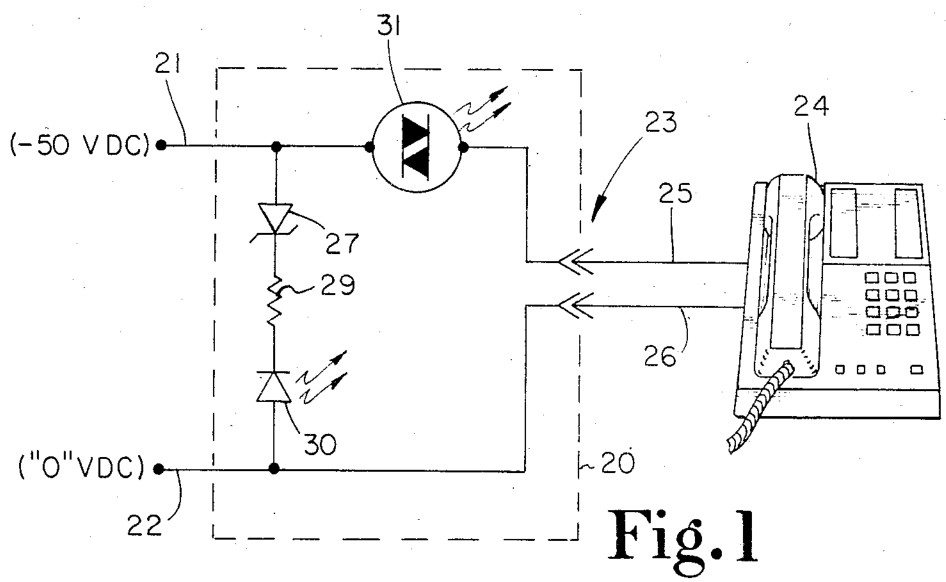
Fig. 1
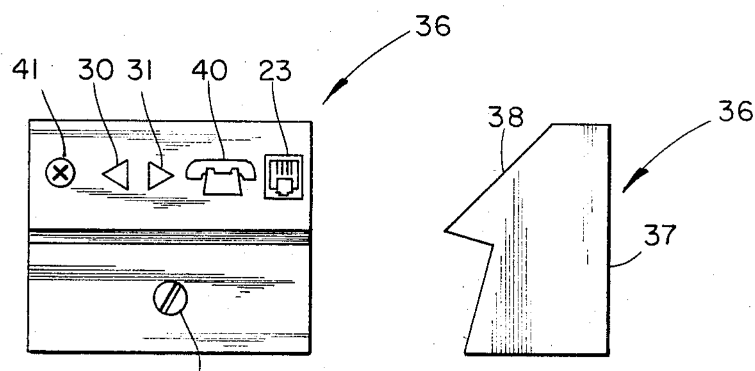
Fig. 2
Fig. 2A
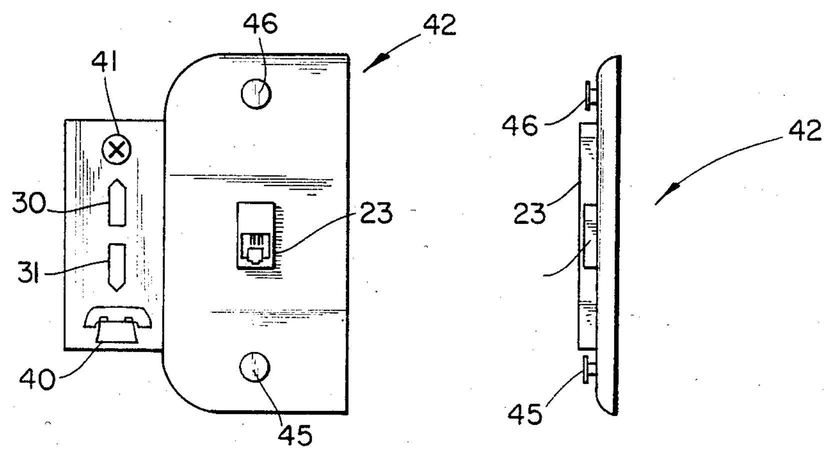
Fig. 3
Fig. 3A

VISUAL DISPLAY NETWORK INTERFACE

BACKGROUND OF THE INVENTION

With the increase in independent telephone companies and local equipment, concerns have been raised as to responsibilities for operational problems. The company controlling the telephone lines in service must decide whether or not a fault is in its portion of the system or rather in the equipment and wiring which is provided by the homeowner or businessman, or by a local, independent vendor. When virtually all portions of the system and service are provided by the same company and a fault (service interruption) occurs, neither the user nor the telephone company is initially concerned as to precisely where in the system the fault is located. A user knows who to call and the service technician knows that the entire system is his responsibility to check out, identify the fault and institute a repair. It matters not whether there is a loss of continuity to the incoming lines or if a piece of equipment inside the home or business has malfunctioned, there is only one company to call.

Once the service or repair technician arrives, the location or source of the fault becomes of concern, but not until then. The obvious advantage of a single provider for all services, as well as all equipment is that "fault" service runs are not made by the wrong company. However, the opening up of the telephone industry by recent legislative and court actions has brought forth numerous equipment providers who simply tie into the main incoming telephone lines which are the responsibility of another company. It is a reality of this commercial setting that split service will continue to exist and thus some means is needed to allow a local user to determine which part of the system is responsible for a service interruption. If a device could be provided at the point of demarcation between the wiring and equipment responsibilities of the two companies, which device would indicate the portion of the wiring and equipment responsible for the fault, it would be a significant advantage over what presently exists, which is virtually nothing.

The present invention provides such a device and while line testing and continuity devices presently exist, there is nothing believed to exist that is structured or functions as does the present invention. Two such line testing devices are disclosed by two patents issued to Ahuja. U.S. Pat. No. 4,369,341 issued Jan. 18, 1983 and U.S. Pat. No. 4,388,501 issued June 14, 1983. Both of these patents pertain to a line test termination device for use as part of a telephone system. The U.S. Pat. No. 4,369,341 is designed for use on a telephone subscriber line and structured to permit a subscriber test to indicate the operability of the subscriber line. The associated circuitry is more complex than that of the present invention, and this particular patent follows not only a different approach, but tries to achieve different results.

U.S. Pat. No. 4,388,501 discloses an audio-visual line test termination device providing a characteristic signature to the telephone central office and a visual and audible signal to the customer when a continuity test is made on a subscriber line. Both of the patent references listed require, according to their disclosure, a 100-volt test current which must be applied by a telephone company employee. In the present invention, identification of system faults is not dependent on the making of a continuity test, all service interruption faults are instantly identified as well as enabling an indication as to what portion of the wiring and equipment is responsible for the fault.

The present invention provides a visually distinguishable point of demarcation for a local telephone company network access line. Secondly, the visual display which is provided by the present invention enables the user to make an indication of the integrity of the network access line while in an idle condition. Thirdly, the visual display of the present invention aids the user in identifying most electrical faults and determining whether or not the fault is in the local telephone company or the user portion of the circuit. Finally, the present invention provides an electrically testable circuit which will aid the local telephone company in determining continuity of the network access line into a user's premises.

Each of these characteristics will be described in greater detail hereinafter. The structure of the device which provides these operational abilities is novel and unobvious and an improvement over whatever may exist in this area of technology.

SUMMARY OF THE INVENTION

A visual display network interface for placement between incoming telephone network access lines to a structure and user telephone equipment within the structure for indicating the operational status of the lines and equipment according to one embodiment of the present invention comprises a modular housing adapted to interface with existing telephone wiring within a structure and providing a single modular jack for user telephone equipment, a pair of outwardly visible indicators carried by the modular housing and being operable to switch on when in a first mode and to switch off when in a second mode and circuit means disposed within the modular housing and electrically connected to the network access lines and to the modular jack, the circuit means being suitably designed and adapted to control the switching of the pair of indicators according to the functionality of the network access lines and user equipment.

One object of the present invention is to provide an improved visual display network interface for telephone equipment.

Related objects and advantages of the present invention will be apparent from the following description.

BRIEF DESCRIPTION OF THE DRAWINGS

FIG. 1 is a diagrammatic and schematic illustration of a visual display network interface according to a typical embodiment of the present invention.

FIGS. 2 and 2A are front elevation an side elevation views, respectively, of a modular housing suitable for packaging the circuitry and indicators of the FIG. 1 visual display network interface.

FIGS. 3 and 3A are front elevation an side elevation views, respectively, of a modular housing suitable for packaging the circuitry and indicators of the FIG. 1 visual display network interface.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated in schematic and diagrammatic form a visual display network interface 20 whose circuitry is denoted by the broken line rectangular box. Coming into this rectangular box are telephone network access lines 21 and 22. Line 21 is denoted as the "ring" side of the access lines while the lower potential side is referred to as the "tip" side of the access line. As indicated, the ring side is at a −48 to −50 volt D.C. potential while the tip side potential is effectively "0" volt D.C. or ground.

Included as part of interface 20 is a single modular jack 23 which is suitably designed and arranged for receipt of the cable from the wiring bridge of a user telephone 24. This user telephone is intended to be representative of that telephone equipment which is located within the user's residence or place of business. As should be understood, a variety of related and peripheral telephone equipment may be employed at the user's location, though descriptively a single user telephone is sufficient for an understanding of the present invention.

The connecting cable (cord) for the user telephone 24 is represented by a pair of lines 25 and 26 whose ends are terminated in a male clip connector compatible with the female modular jack 23. This assembly concept of the user telephone to the interface is typical of that presently used by most phone companies wherein a small spring clip type connector is employed on the end of the telephone cable and snap locks into an open receptacle or modular jack on the wall or along the baseboard, depending upon the modular style. A similar electrical connection is also employed on wall telephones which are designed as modular units. One of the advantages with this type of installation and electrical interconnect is the ability to move a phone from one room to another so long as the rooms are equipped with an appropriate modular point of connection. To remove a telephone from one room, all that is required is to release the spring clip from the connector and allow the cable for the phone to be removed from the receiving jack. Thereafter it may be reinserted in a different modular jack to restore service to that telephone at a different location.

So far, what has been described is a fairly basic telephone system wherein the network access lines provide service to the user telephone which in turn is designed and arranged to interface with the network access lines for a complete system. However, without interface 20, whose detailed operation will be described hereinafter, a malfunction of the user telephone cannot be isolated to either the user equipment or to the incoming network access lines. Consequently, the problems previously mentioned with regard to current systems persist. It is extremely difficult to determine, when a fault results, where or what the cause of that fault may be. When these faults occur, typically referred to as service interruptions, the user of the equipment must call either the service or repair technician for the inside equipment or the telephone company for the network access lines or both. Since the problem is one place or the other, and usually not both, this type of unpredicatability or the inability to identify where the fault is located simply means an extra trip for either the local company which maintains the user equipment or the telephone company which provides the network access lines. Obviously, these types of problems only result when the companies that provide one of the two items is different. However, with the freedom now in existence with regard to telephone equipment sales and service, it is quite likely that a variety of households or businesses include equipment by one company but incoming line service by a different company.

Referring specifically to the circuitry of interface 20, in an idle condition current supplied on the ring side (line 219 of the access line is directed through Zener diode 27 and resistor 29 to a low-current, light-emitting diode (LED) 30. The current continues under controlled flow to the lower potential tip side of the access line. This current flow causes light-emitting diode 30 to illuminate indicating that both conductors of the access line are functional. As should be understood, diode 30 represents one indicator of interface 20 and is operable due to its construction and the surrounding associated circuitry to assume one of two modes of operation. These two modes of operation are either in an illuminated state ("on") as just described, or an unilluminated state ("off") when the conditions regarding interface 20 are not as described and thus not capable of illuminating light-emitting diode 30.

If continuity of either conductor of the access line is interrupted (open circuit), either line 21 or 22, or if a short circuit exists, light-emitting diode 30 is extinguished thereby indicating a fault in the local telephone company portion of the circuit, that portion being the network access lines which are provided by the local telephone company as opposed to the company providing the equipment. Light-emitting diode 30 may also be extinguished similarly indicating a fault in the local telephone company portion of the circuit if a foreign source of low potential (ground) is applied to the ring side (line 21) or a foreign source of a higher potential (battery) is applied to the tip (line 22) of the access line.

During a "line-in-use" condition, current from the ring side of the access line is redirected through bipolar, tri-color light-emitting diode 31 to modular jack 23. Current then flows through the user terminal equipment (off-hook condition), in the illustrated embodiment a user telephone 24, to the lower potential tip side of the access line (line 22) causing light-emitting diode (LED) 31 to illuminate thereby indicating that the access line is functional. If continuity of the access line is interrupted within the premises of the user, light-emitting diode 30 remains illuminated indicating access line function while LED 31 will not light and the user's telephone equipment will be inoperable. If a short circuit occurs or a foreign source of lower potential is applied to the ring side of the access line within the user's premises, then light-emitting diode 31 illuminates indicating the access line is functional, while the user telephone equipment may be rendered inoperable due to equipment failure or wiring faults.

The purpose of diode 27 is to serve as a voltage sensing switch for LED 30. In operation diode 27, whose voltage rating can be anywhere below 47 volt D.C., "senses" a voltage potential above its rated breakover value, and "turns on" or begins to conduct the excess voltage. As this occurs, the internal resistance of diode 27 serves to reduce the voltage applied to resistor 29. Resistor 29 is used to further reduce the voltage potential and current flow to a point within the desired operating range of LED 30.

The voltage sensing capability of diode 27 becomes significantly important when a "resistive fault" in the telephone company circuitry occurs. More specifically, if a short circuit, a ring (−50 volt D.C.) to a lower potential ground or a tip ("0" volt D.C.) to a higher potential, foreign voltage source occurs, LED 30 will be extinguished under normal circumstances. However, if this connection is nonmetallic, i.e., wet cable conductors, the resistance in the conductive path to the fault may be high enough to cause a service interruption but not extinguish LED 30. When this particular situation exists, the importance of diode 27 can be recognized. When a resistive fault is present, the voltage applied to diode 27 decreases as the resistance of the fault decreases. By design, this continues until the resistance of the fault reaches a service interrupting level. Similarly, the voltage applied to diode 27 drops to a point below its "break over" value and becomes nonconductive thereby extinguishing LED 30.

As far as the purpose of the bi-polar, tri-color LED 31 is concerned, it is really three-fold. This LED functions in accordance with both the polarity of applied current and the type (AC or DC) of current applied. Under normal conditions, the ring (−50 volt D.C.) potential is applied to the red anode of LED 31. When a telephone is used, current flows through LED 31 producing red light. If the polarity of the telephone company access line becomes reversed, the ring (−50 volt D.C.) potential is applied to the green anode of LED 31 producing green light.

One significance of this is that if a simple red LED were used and polarity reversed current flow would be blocked and service interrupted. Another benefit of the use of the bi-polar LED is evidenced when a reversal occurs on a "Touch-Tone" equipped user. In this case, the user is prohibited from originating a call with "Touch-Tone" equipment.

With the understanding that this reversal may occur either in the local telephone company portion of the service or the user's portion of the service, the following will occur. In the case of an access line reversal, LED 30 is extinguished when idle and LED 31 produces a green light when an outgoing call is attemped. If, however, the reversal is in the user portion of the circuit, LED 30 illuminates when idle, and when a call is attempted, LED 31 produces red light. In both these instances, the user has a clear indication of the source of the problem.

Another advantage of the bi-polar, tri-color LED is its ability to produce yellow light when alternating current is applied. The significance here being that normally 110 volt A.C. current is applied to the access line during the ringing cycle of an incoming call. LED 31 therefore provides a visual indication of an incoming call in the form of a yellow flashing light. A user who is not receiving incoming calls can determine if the access line or their equipment is at fault by merely observing LED 31 during a known incoming call.

Interface 20 is designed to operate on a continuous basis using the normal 48–52 volt D.C. standby talk voltage which exists on all standard telephone lines at all times. The circuitry used in this invention is designed to allow a minimal current flow between conductive paths under normal operating voltage. The present invention provides a simple method whereby the telephone equipment user can readily identify most faults located in the telephone company portion of the circuit and alert the appropriate company to the existence of the fault for an efficient repair and return to service. The visual indicators provided as part of the interface permits the telephone equipment user to determine whether a fault with the equipment is located within the premises wiring or terminal equipment or is associated with the incoming network access line. This invention will enable a reduction in local telephone company expenditures which are used to receive and analyze reports or service interruptions where the location of an electrical fault is ultimately found to be in the user/vendor areas of responsibility. Additionally, the present invention will reduce local telephone company expenditures used to dispatch service technicians to user premises to isolate electrical faults which are ultimately found to be in the user/vendor areas of responsibility. The invention will similarly reduce expenses incurred by the telecommunications equipment vendors in dispatching service technicians to user premises simply to isolate electrical faults which are in the local telephone company's area of responsibility. By enabling the telephone equipment user to determine which company should be called, all of the parties involved in the providing and using of telephone equipment and its service will benefit from the present invention.

One of the convenience aspects of the present invention is the modular housing into which the interface circuitry is packaged. Two alternatives are disclosed in the remaining FIGS. 2, 2A, 3 and 3A, wherein FIGS. 2 and 2A denote a modular housing 36 which is designed as a baseboard unit. As illustrated by the side elevation view of FIG. 2A, modular housing 36 includes a substantially flat rear panel 37 and an upwardly inclined display panel 38. This particular package geometry permits two results. The first is that rear panel 37 is adapted to mount flush against a wall or baseboard surface and is secured thereto by means of threaded fastener 39. In this orientation, inclined front panel 38 is directed upwardly toward the line of sight of the user such that it is relatively easy to look down at modular housing 36 and determine the status of light-emitting diodes 30 and 31. These two light-emitting diodes are disposed side by side adjacent modular jack 23 such that the user of the telephone equipment can very quickly and easily determine the status of light-emitting diodes 30 and 31 in order to determine, if a fault is occurring, the area of responsibility for correcting such a fault.

Symbol 40 is a representation of a telephone and symbol 41 is intended to represent the exterior access lines. When there is continuity to both access lines, LED 30, pointing toward symbol 41, is illuminated. When the interior telephone is in use and all portions are functionel, LED 31 is illuminated. The arrowhead directions for LED's 30 and 31 are oriented so as to point toward the appropriate symbol such that illumination signifies an operative condition of that part of the system represented by the symbol, and vice versa.

Referring to FIGS. 3 and 3A, modular housing 42 is illustrated which is designed for wall telephone attachment. The display panel portion 43 of modular housing 42 is out to the side allowing substantially flat panel 44 to serve as the attachment surface for the wall phone. Large headed rivets 45 and 46 serve as the attachment means for the back panel of the wall phone such that the phone may be slid into position over these rivets while an electrical connection is made between the male connector at the back of the wall phone and female modular jack 23. Light-emitting diodes 30 and 31 are disposed as part of display panel 43 and provide either the illuminated or unilluminated mode of operation, depending upon circumstances within interface 20 as determined by the incoming network access lines and the status of the user equipment within the business or residence. The use of symbols 40 and 41 and the arrowhead directions for LED's 30 and 31 is the same as previously described for FIGS. 2 and 2A. Although different modular housing styles have been indicated in FIGS. 2 and 3, it should be understood that the circuit components and design of interface 20 remain the same regardless of the modular housing style. Consequently, reference numerals 30 and 31 for the two light-emitting diodes and reference numeral 23 for the modular jack have been used consistently throughout the various descriptions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. Visual display means for placement between the incoming telephone network access line to a structure and user telephone equipment within the structure for indicating the operational status of said network access line and said telephone equipment, said visual display means comprising:
- a modular housing;
- a pair of outwardly visible indicators carried by said modular housing and being operable to exist in a switch-on condition when in a first mode and to exist in a switch-off condition when in a second mode; and
- circuit means disposed within said modular housing and adapted to interface with existing telephone wiring within a structure and for providing a modular jack for said user telephone equipment, said circuit means being designed and arranged for controlling the switched condition of each indicator according to the operational status of the network access lines and user equipment, said circuit means includes in series a Zener diode and resistor which are in series with one of said visible indicators.

2. The visual display means of claim 1 wherein said circuit means further includes a modular jack receptacle arranged for plug-in receipt of a telephone cord clip connector.

3. The visual display means of claim 2 wherein the other of said visible indicators is a bi-polar, tri-color light-emitting diode.

4. Visual display means for placement between the incoming telephone network access line to a structure and user telephone equipment within the structure for indicating the operational status of said network access line and said telephone equipment, said visual display means comprising:
- a modular housing;
- a pair of outwardly visible indicators carried by said modular housing and being operable to exist in a switched-on condition when in a first mode and to exist in a switched-off condition when in a second mode; and
- circuit means disposed within said modular housing and adapted to interface with existing telephone wiring within a structure and for providing a modular jack for said user telephone equipment, said circuit means being designed and arranged for controlling the switched condition of each indicator according to the operational status of the network access lines and user equipment, said circuit means and visible indicators being cooperatively arranged to indicate continuity of both access lines by illumination of one of said visible indicators, said circuit means and visible indicators being cooperatively arranged to further indicate continuity of said user telephone equipment during a line-in-use condition by illumination of the other of said visible indicators.

5. Visual display means for placement between the incoming telephone network access line to a structure and user telephone equipment within the structure for indicating the operational status of said network access line and said telephone equipment, said visual display means comprising:
- a modular housing;
- a pair of outwardly visible indicators carried by said modular housing and being operable to exist in a switched-on condition when in a first mode and to exist in a switched-off condition when in a second mode, one of said visible indicators is a bi-polar, tri-color light-emitting diode which is cooperatively arranged with said circuit means to indicate any one of three equipment status conditions by the color illuminated; and
- circuit means disposed within said modular housing and adapted to interface with existing telephone wiring within a structure and for providing a modular jack for said user telephone equipment, said circuit means being designed and arranged for controlling the switched condition of each indicator according to the operational status of the network access lines and user equipment.

6. The visual display means of claim 5 wherein the three colors of said light-emitting diode are green, red and yellow, each color being generated by different electrical conditions existing with said equipment.

* * * * *